(12) United States Patent
Kanai (10) Patent No.: US 6,625,335 B1
(45) Date of Patent: Sep. 23, 2003

(54) METHOD AND APPARATUS FOR ASSIGNING KEYWORDS TO DOCUMENTS

(75) Inventor: Junichi Kanai, East Windsor, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/568,409

(22) Filed: May 11, 2000

(51) Int. Cl.[7] ............................. G06K 9/54; G06K 9/60
(52) U.S. Cl. ...................... 382/306; 382/177; 382/179; 707/3; 707/6; 707/100
(58) Field of Search ......................... 707/10, 500, 512; 382/305, 306, 177; 715/512, 514, 530

(56) References Cited

U.S. PATENT DOCUMENTS

| | | | |
|---|---|---|---|
| 3,995,389 A | | 12/1976 | Mathis ........................... 40/360 |
| 5,088,026 A | | 2/1992 | Bozman et al. .............. 395/425 |
| 5,146,600 A | | 9/1992 | Sugiura ........................ 395/800 |
| 5,172,281 A | | 12/1992 | Ardis et al. ................. 360/72.2 |
| 5,257,074 A | * | 10/1993 | Kamei ......................... 358/1.11 |
| 5,404,514 A | | 4/1995 | Kageneck et al. ........... 395/600 |
| 5,410,663 A | | 4/1995 | Blackburn et al. .......... 395/400 |
| 5,428,778 A | | 6/1995 | Brokes .......................... 395/600 |
| 5,473,744 A | | 12/1995 | Allen et al. .................. 395/154 |
| 5,610,812 A | | 3/1997 | Schabes et al. ............. 395/759 |
| 5,625,810 A | | 4/1997 | Kurosu et al. ............... 395/601 |
| 5,649,191 A | * | 7/1997 | Hirano et al. ................ 395/613 |
| 5,754,939 A | * | 5/1998 | Herz et al. .................. 455/3.04 |
| 5,757,959 A | * | 5/1998 | Lopresti ...................... 382/186 |
| 5,784,699 A | | 7/1998 | McMahon et al. .......... 711/171 |
| 5,809,561 A | | 9/1998 | Sheffield et al. ............ 711/206 |
| 5,821,929 A | * | 10/1998 | Shimizu et al. .............. 382/190 |
| 5,825,919 A | * | 10/1998 | Bloomberg et al. ......... 382/171 |
| 5,832,474 A | | 11/1998 | Lopresti et al. ................. 707/2 |
| 5,848,202 A | * | 12/1998 | D'Eri et al. ................. 235/375 |
| 5,864,857 A | | 1/1999 | Ohata et al. ................. 707/100 |
| 5,873,089 A | | 2/1999 | Regache ...................... 707/100 |
| 5,913,222 A | | 6/1999 | Liedtke ........................... 711/3 |
| 5,953,700 A | * | 9/1999 | Kanevsky et al. ......... 704/270.1 |
| 5,964,857 A | | 10/1999 | Srinivasan et al. .......... 710/126 |
| 6,012,069 A | * | 1/2000 | Shibazaki .................... 345/838 |
| 6,058,398 A | | 5/2000 | Lee ............................. 707/104 |
| 6,243,723 B1 | * | 6/2001 | Ikeda et al. .................. 707/514 |
| 6,247,031 B1 | * | 6/2001 | Sugiura et al. .............. 382/305 |
| 6,311,214 B1 | * | 10/2001 | Rhoads ........................ 380/255 |
| 6,317,740 B1 | * | 11/2001 | Mukherjea et al. ............ 707/1 |
| 6,334,025 B1 | * | 12/2001 | Yamagami .................... 386/96 |
| 6,336,124 B1 | * | 1/2002 | Alam et al. ................. 707/523 |
| 6,401,069 B1 | * | 6/2002 | Boys et al. ................. 396/213 |
| 6,424,429 B1 | * | 7/2002 | Takahashi et al. .......... 358/1.16 |

\* cited by examiner

Primary Examiner—Jean R. Homere
Assistant Examiner—Leslie Wong
(74) Attorney, Agent, or Firm—Harness, Dickey & Pierce, PLC (57) ABSTRACT

A keyword assignment system is provided to assign keywords when a digitized image of a document is created. The keyword assignment system includes a digitizer to generate the digitized image from the input document. A keyword entry system determines a keyword to be associated with the digitized image. A linker generates linking information that associates the keyword with the digitized image. A database is provided to store the digitized image and linking information.

28 Claims, 4 Drawing Sheets

METHOD AND APPARATUS FOR ASSIGNING KEYWORDS TO DOCUMENTS

BACKGROUND AND SUMMARY OF THE INVENTION

The present invention relates generally to systems for scanned image processing. More specifically, the invention relates to a system for linking keywords to digitized images.

With the increasing spread in electronic commerce, there has been a commensurate increase in electronic copying technology. Digital imaging technology employing electronic imaging devices such as scanners, networked digital copiers, and fax machines is now widely available. These electronic imaging devices enable users to convert paper documents into image files. However, conventional copy devices do not generally include the capability to assign keywords to the image files. Hence, users must use other means to assign keywords such as a personal computer having appropriate software.

The present keyword assignment system provides a method and apparatus for assigning keywords when the digitized image of a document is created. The keyword assignment system includes a digitizer to generate the digitized image from the input document. A keyword entry system determines a keyword to be associated with the digitized image. A linker then merges the keyword with the image file or alternatively generates linking information that associates the keyword with the digitized image. A database is provided to store the digitized image and linking information.

DETAILED DESCRIPTION OF THE PREFERRED EMBODIMENT

Figure 1:
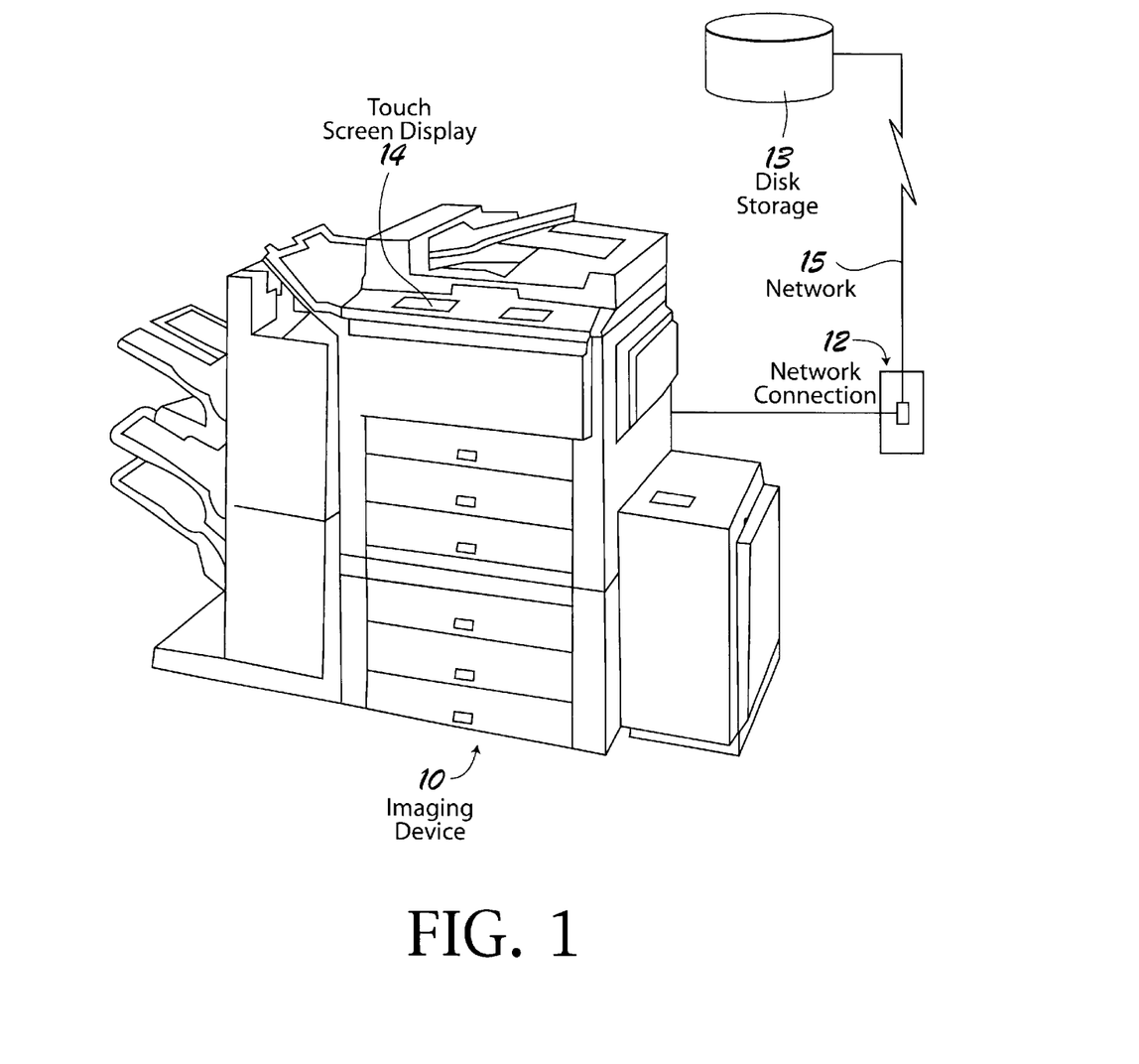
FIG. 1 is a perspective view of an imaging device, e.g., a digital copier, into which the keyword entry system is incorporated.

The techniques of the invention may be used in a variety of different electronic imaging devices, including photocopy machines, fax machines, multifunction peripheral devices (supporting scanning, faxing and printing), scanners, document imaging systems and document management systems. For illustration purposes the exemplary electronic imaging device 10 shown in FIG. 1 is a digital photocopy machine. The digital photocopy machine 10 may include a suitable network interface for connecting the machine to a computer network. This connection, shown generally at 12, allows document images obtained by processing them through the photocopy machine to be transferred to a remote storage device 13, such as a disk drive system associated with a computer network 15. Such a configuration allows electronic copies of photocopied documents to be stored on a computer network for later retrieval.

The invention provides a convenient, user-friendly means for attaching or associating keywords with the document images. The keywords are useful, for example, in performing subsequent search and retrieval operations. While there are a variety of different ways to implement the apparatus and method of the invention, a presently preferred approach embeds the keyword assigning functionality within the electronic imaging device itself. Several different embodiments are described here. Those skilled in the art will recognize that other embodiments are also possible.

The electronic imaging device 10 of one a presently preferred embodiment includes a touch screen display 14 through which the user interacts with the keyword assigning system. As will be more fully described, the user may enter user identification information, make keyword menu selections and enter new keywords through this touch screen. As more fully described, the user may also enter keywords using alternate input techniques, including voice recognition, on-line handwriting recognition, electronic ink matching. Electronic ink matching involves matching a user-drawn annotation, which can be any hand-drawn marking, without performing recognition on the annotation. Thus even a child could assign a hand-drawn "keyword" to a document and the system would allow it to be retrieved later by electronic ink searching for a matching annotation. The electronic ink searching capability is also ideal for associating Kanji characters, Chinese characters, or other types of symbols that are not otherwise supported by the native computer operating system.

As will be more fully explained, another preferred embodiment allows the user to specify keywords by writing them, printing them or circling them on a first page or cover sheet associated with the document being imaged. The system will automatically identify the user-specified keywords on the page being scanned and then attach or associate that keyword with the document being imaged.

Figure 2:
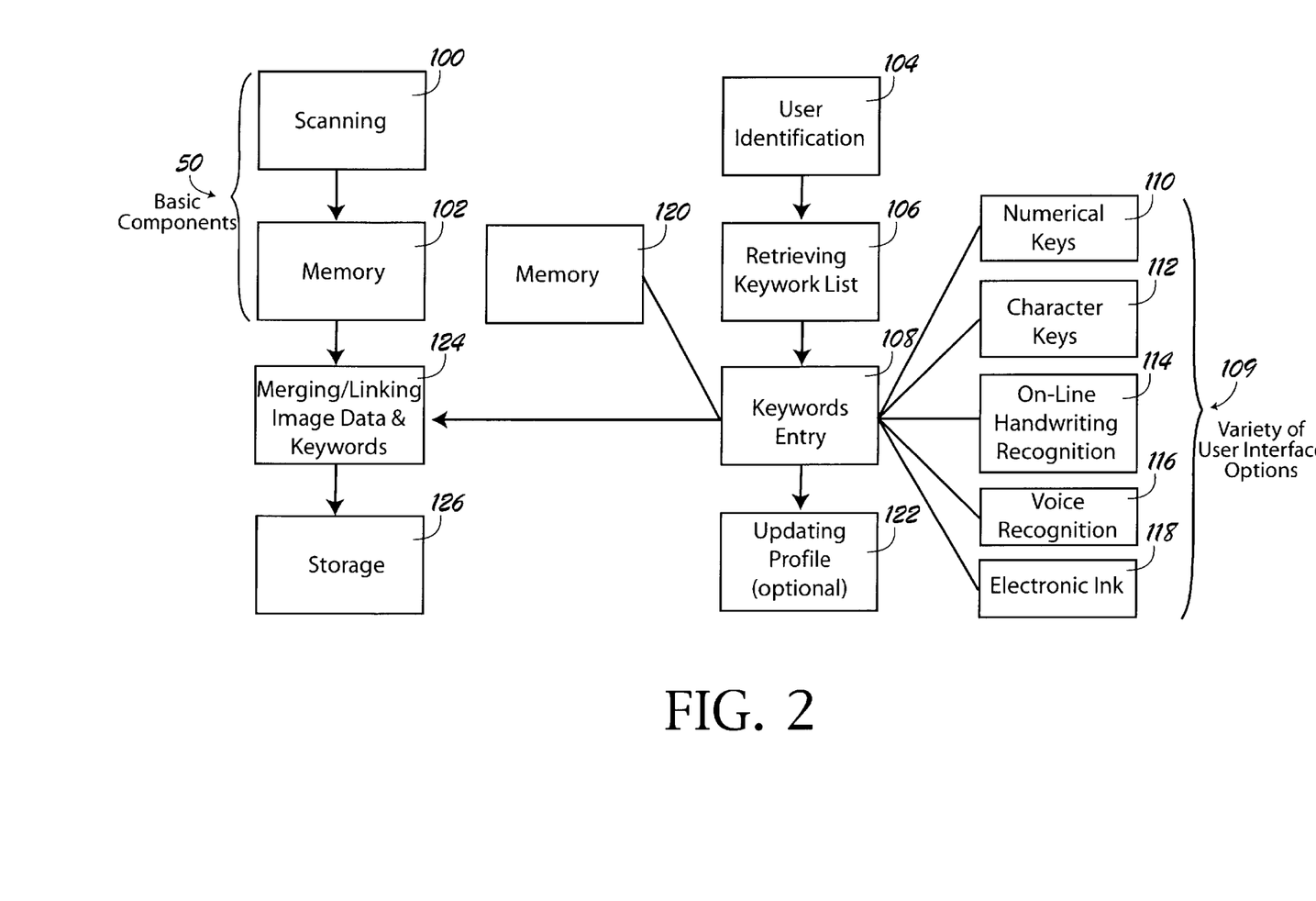
FIG. 2 is a block diagram illustration of first and second embodiments of a keyword assignment system that incorporates the principles of the present invention.
Figure 3:
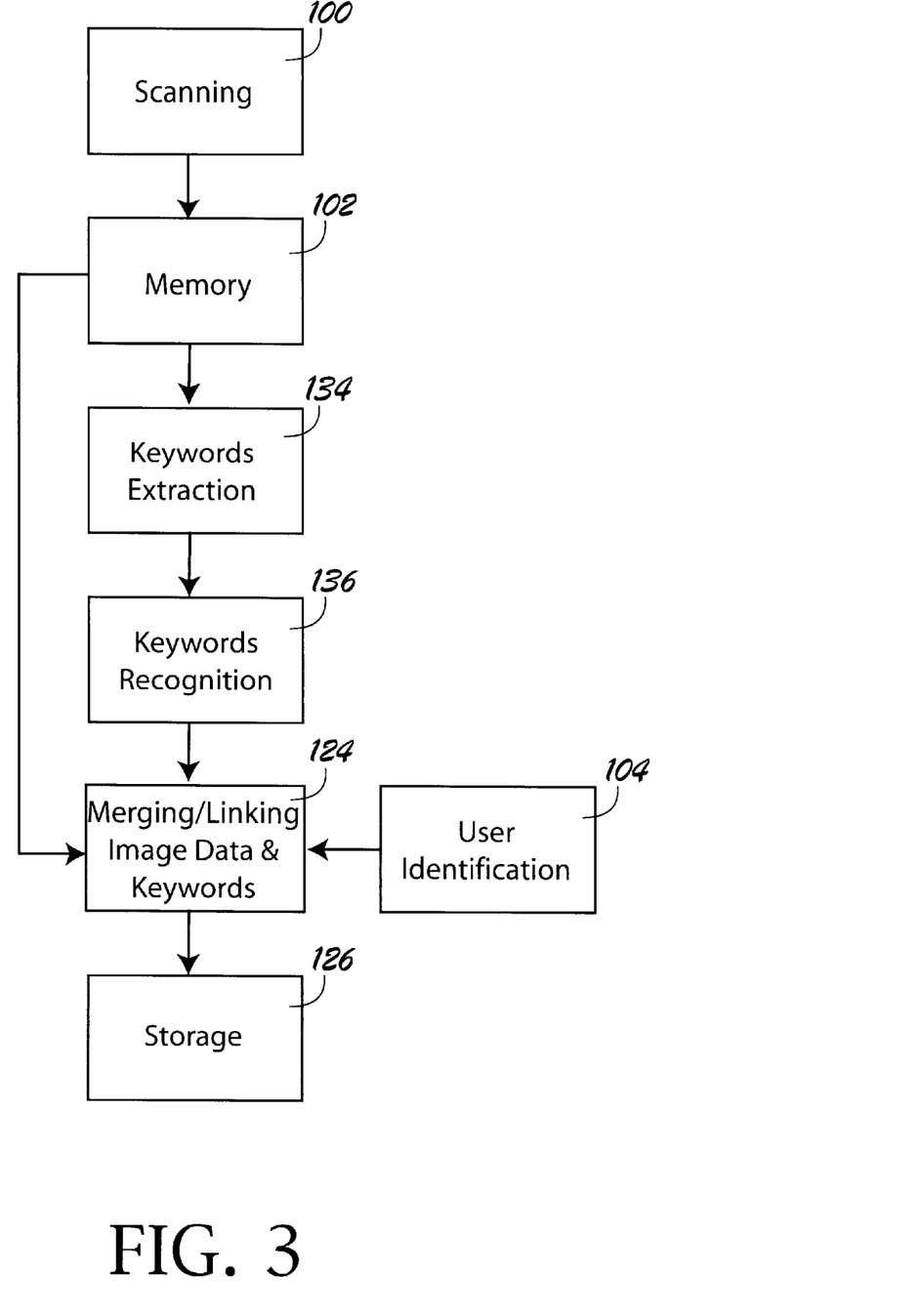
FIG. 3 is a block diagram illustration of a third embodiment of a keyword assignment system that incorporates the principles of the present invention.

FIG. 2 shows a first embodiment and a second or alternate embodiment of an apparatus for assigning keywords to documents in accordance with the invention. FIG. 3 shows yet another embodiment which uses keyword extraction techniques such as circled region extraction techniques. Each of the illustrated embodiments are designed to afford a simple and convenient user interface with which to assign keywords to document images. Because the interface is integrated with the imaging apparatus, users are able to enter appropriate keywords when they digitize documents, without requiring any additional equipment.

Referring to FIG. 2, the components and subprocesses for the first embodiment, and also the second or alternate embodiment, are illustrated. The basic difference between the two embodiments is that the first embodiment uses a keyword list and thus employs a subsystem for retrieving keywords. The alternate embodiment does not employ a keyword list and thus it does not require the keyword retrieval subsystem. The remaining subsystems of these two embodiments are the same and will thus be described together.

The basic components of an electronic imaging device are shown at 50 to include a scanning module or scanning apparatus 100 and a suitable memory 102 for storing the scanned image. In these embodiments, the user interacts with the electronic imaging device through a suitable user identification mechanism 104. The user identification mechanism can take a variety of different forms; magnetic card, password, signature recognition, voice recognition, Smart Card, thumbprint identification, and the like. The user identification module may associate a user I.D. with each user. The I.D. serves as a key for identifying that user in subsequent database operations.

As noted above, a first preferred embodiment employs a stored keyword list. Thus the embodiment includes a keyword retrieval subsystem 106 that accesses a list of keywords stored in memory 120. The list of keywords may comprise a set of predefined and/or customized keywords that are stored in relation to a user I.D. Memory 120 can be a local memory device associated with the electronic imaging device 50, or it may be a remote data source accessible via a suitable network connection. If desired, memory 120 can be a local memory device that is supplied with keyword data by downloading it from a network remote data source. Alternatively, the memory 120 can be a memory device associated with a user I.D. card, such as a Smart Card, that is installed into a suitable card reader associated with the electronic imaging device. If a Smart Card or other portable memory device is used, each user can carry a copy of his or her keyword list on the ID card itself.

The keyword retrieval subsystem 106 works in conjunction with a keyword entry subsystem 108. The keyword entry subsystem 108 provides a variety of different user interface options shown generally at 109. Keywords entered by the user are stored in memory 120 for current use or for use at a later time. In FIG. 2, the keyword retrieval subsystem has been illustrated as being in communication with keyword entry subsystem 108; and keyword entry subsystem 108 has been illustrated as being in communication with memory 120. Thus in the illustrated embodiment the keyword entry subsystem 108 interacts with memory 120 and keyword retrieval subsystem 106 interacts with memory 120 through subsystem 108. Of course, it is possible to configure an alternate embodiment in which the keyword retrieval subsystem 106 communicates with memory 120 directly.

The keyword entry subsystem 108 of the preferred embodiment consists of a touchpad, memory and a CPU. The graphical user interface associated with the touchpad can be implemented as a web browser that supports XML (Extensible Mark-up Language) as well as other mark-up languages. If desired, the system may be configured so that when a user enters his or her user identification, the layout of the user interface will be automatically customized to that user's preferences. User preferences are stored in the Profile data store 122, an optional feature of the preferred embodiments. Also, once the user enters his or her user identification, the keyword retrieval subsystem 106 obtains the user's pre-stored keywords from memory 120 and displays them on the touch screen according the user's preferred layout.

Keywords are stored in memory 120 in association with user I.D.'s, so that the entry of a user I.D. will retrieve those keywords that the user has available, including any customized keywords the user may have entered. The keywords are preferably stored in a logical data structure to make it more convenient for the user to select the appropriate keyword for a given document. In the preferred embodiment a hierarchically arranged data structure is employed. Preferably a mark-up language is used to tag the keywords with self-describing data structures. In this regard, XML may be used. Ideally, the keywords should be arranged to allow the user to quickly identify an appropriate list and select the keyword or keywords that best apply to the scanned image.

By way of illustration, the following hierarchically arranged data structure might be used in connection with the user I.D., Secretary A:

```
Secretary A - Expense Report  -- Purpose
            |                 |- Date or Period
            |                  Account
            Purchase Order    -- Requested by (or Project)
                              |- Vendor
                              |- Date
                               - Account
```

In the above example, assume that Secretary A enters his or her identification: "Secretary A" through suitable means such as by using a magnetic card inserted into a card reader on the imaging device. The keyword retrieval subsystem 106 and its associated keyword entry system 108 will retrieve the information stored in memory 120 associated with that user I.D. All or a portion of the contents of memory 120 would then be displayed on the touch screen or on another suitable display screen.

While the presently preferred embodiment uses an inexpensive touch screen to display keyword choices and to receive the user's input, a larger system might employ a CRT or flat panel LCD display screen. Such display screen may include an associated computer subsystem for running a client application or browser for display of the information stored in memory 120. In such a configuration, memory 120 and the associated submodules 106 and 108 would function as an information server, supplying information to the browser's client application for display to the user.

Depending on the quantity of information to be displayed, only the top level data elements may be displayed: "Expense Report" and "Purchase Order". Alternatively, if a larger display is available, lower level choices may also be displayed: "Purpose" "Requested by (or Project)". The user interface may include a suitable selection mechanism in addition to or as a substitute for the touch screen. Such selection mechanism may be a pointing device (track ball, touch pad, mouse, joy stick) or keyboard for selecting keywords from the displayed list and for selecting lower level data structures based on a displayed data element.

In some applications, it may be possible to dispense with the user identification process. Thus the user identification subsystem 104 is optional in those applications. Instead of requiring the user to identify himself or herself, an alternate embodiment would allow the user to simply choose directly from an appropriate list of keywords. This would be done by displaying in hierarchical fashion a selection of keywords from which the user may choose. Alternatively, the user can enter the keyword directly using the keyword entry subsystem 108.

As noted above, the keyword entry subsystem 108 has a variety of different user interface options. These include, numerical keys 110 and character keys 112, which may be provided using a physical keyboard or a virtual key board displayed on a computer touch screen. An on-line handwriting recognition module 114 allows the user the interact with the system through handwritten messages and a voice recognition system 116 allows the user to interact with the system using speech. As an alternate to on-line handwriting recognition, an electronic ink matching system 118 may be used. The electronic ink matching system may be implemented as described in U.S. Pat. No. 5,832,474, Lopresti, et. al. to retrieve information by conducting a partial match search against user-drawn annotations.

Associated with the keyword entry module 108 is the keyword merging/linking module 124. Module 124 is responsible for merging or linking the user-selected keywords to the image data stored in memory 102. The keywords can be merged into the data structure of the image data file, such as within the tag of a TIFF file. Alternatively, the keywords can be linked to the image data file using suitable database software, or linked to a file as the file name (such as PO100.tif generated from the keyword "Purchase Order 100"), or used to specify a directory used to store an image, such as saving an image related to "Project-A" in the directory called Project-A. The resultant merged/linked image data and keywords are then supplied to a storage device 126 which can be either a locally attached device or a remote storage device accessed through a suitable network connection.

The second alternate embodiment of the invention dispenses with the keyword list. Thus subsystem 106 is not required. The keyword entry subsystem 108 is still used, however. The user evokes one of the keyword input mechanisms 109 to enter keywords directly into module 108. Module 108, in turn, supplies the user selected keywords to the merging and linking module 124. If desired, the computationally expensive components, such as the handwriting and voice recognition components and/or the circle extraction and/or electronic ink processing components may be implemented on a remote server, such as the server associated with the image storage system.

A third embodiment of the invention is illustrated in FIG. 3. This embodiment employs a keyword extraction technique that can be used to eliminate the need for the keyboard, handwriting, voice and electronic ink input mechanisms. Instead, the embodiment uses the scanning subsystem 100 and its associated memory 102 for input of the desired keywords. The user handwrites keywords on the first page of a document or on a cover sheet and those handwritten keywords are scanned and stored as images in memory 102. The keyword extraction module 134 and keyword recognition module 136 then analyzed the users handwritten keywords to extract them and convert them into suitable alphanumeric text that may be then merged or linked with the remaining image data by module 124.

As an alternate to user handwritten entry of keywords, a circled region extraction technology may be employed. The details of the presently preferred extraction technology are described below. Instead of handwriting the keywords, the user simply draws circles around keywords that already appear in the text of the document being scanned. The circled region extraction technology identifies the user-drawn circles, then extracts the keywords within those identified circles. Preferably, the extracted keywords are then recognized.

In some instances it may be useful to attach some form of user identification to the images being stored. The user identification module 104 provides this information directly to the merging/linking module 124, as illustrated. The user identification module 104 can be implemented in any of the ways described above in connection with FIG. 2. In all embodiments it may also be beneficial to add date and time information to the images being stored. Such information can be input by the user identification module 104. Of course, the date and time information may be added using other modules as well. In this regard, the merging and linking module 124 might be provided with the date and timestamp capability, for example.

Circled Region Extraction

The presently-preferred user-circled region extraction technology uses a contour analysis technique. The technique is based on identifying the contour of a candidate object. The candidate object may include user-drawn circles, machine printed frames or other non-text materials on the page. By analyzing the contour using a feature extraction module, the algorithm extracts the user-drawn circle. The contour is represented by a sequence of points with different curvature values. This makes it possible to distinguish a user-drawn circle from a machine-printed frame through a post processing analytical technique.

Figure 4:
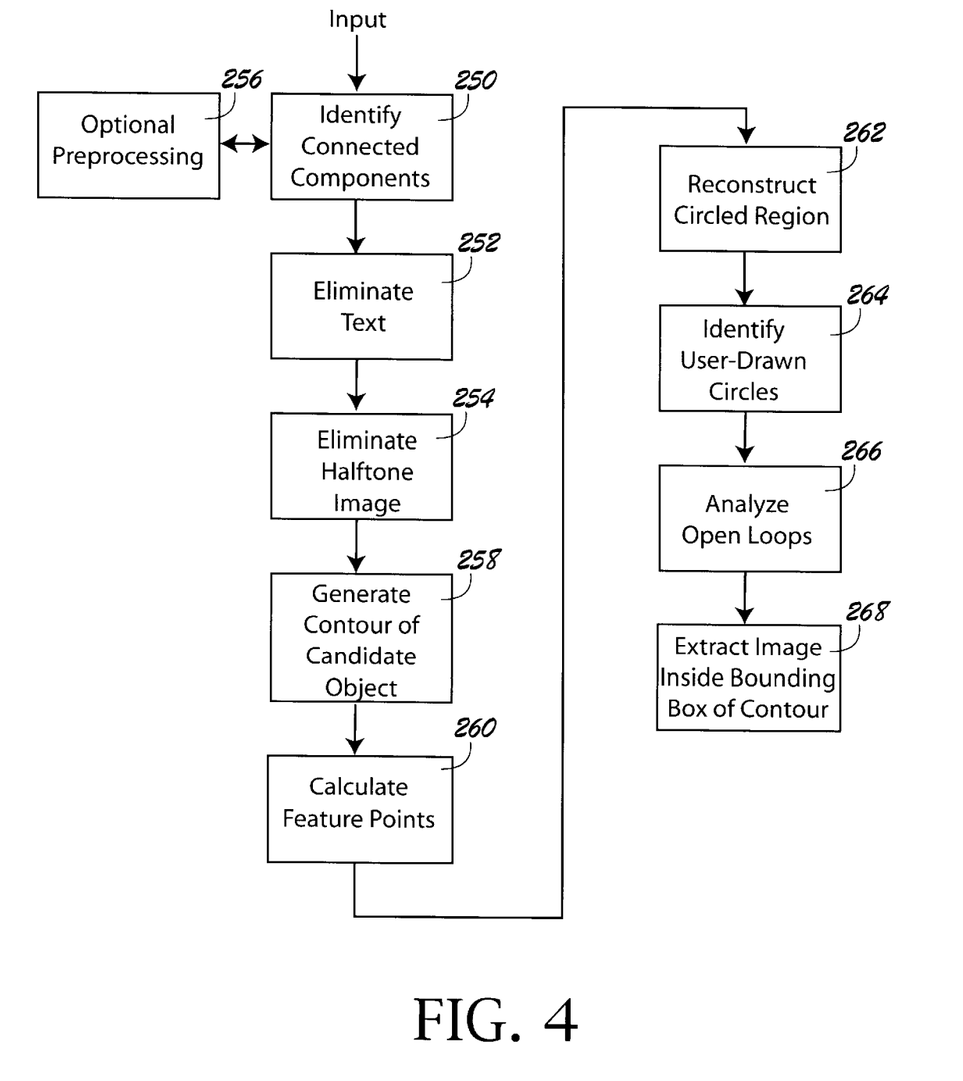
FIG. 4 is a flow diagram illustrating how the circled region extraction technology may be implemented.

Referring to FIG. 4, the first step (step 250) is to find the connected components within a given page. In this step the image is scanned line-by-line and each pixel is labeled if it is connected with its neighboring pixels. After labeling the pixels for connectivity, a bounding box is calculated for each connected component. These bounding boxes are used to extract the candidate area in the image.

Next (at step 252) connected components representing text are eliminated. This is accomplished by analyzing the size of the bounding box and eliminating those connected components that have bounding boxes below a predetermined size.

Next, halftone images are eliminated at step 254. Halftone images compose large connected components. The algorithm detects halftone images by assessing the black-to-white pixel ratio within the bounding box associated with the connected component in question. Halftone images tend to have more black pixels than areas containing text.

To speed up the algorithm, an optional pre-processing step may be performed at 256. The contour analysis technique may generate more feature points than are actually required when there are extraneous characters touching the contour in question. This can occur, for example, when the user draws a circle that happens to intersect with other characters on the page.

The optional pre-processing step eliminates these touching characters by performing a morphological operation to simplify the shape of the contour in the region where the user-drawn circle and extraneous character intersect.

Next, the user-drawn circle is identified by examining different candidate areas on the page. The first step in this procedure, depicted at 258, involves generating the contour of the candidate object. This is performed by tracing the outline of the object. The contour is represented in computer memory as an ordered set of points (coordinates of the boundary pixels). The tracing scheme first scans for the starting point (a border pixel that is not previously traced). Then the trace starts in a clockwise direction along the convex outline of the object. When the trace goes back to the starting point, or to a point where no more black pixels can be found around the current one, the trace stops and the scanning process to find the next starting point continues.

Next the contours obtained during step 258 are analyzed by calculating feature points associated with each contour (step 260). Contours obtained from step 258 can be closed curves or broken curves, due to noise in the image. Feature points are defined as high curvature points, including junctions of circles with other objects. Curvature can be calculated using re-sampling techniques, however this may not be reliable when noise is generated during the digitization process. By observation, the feature points can be detected approximately at either the local maxima or local minima on the x and y directions, even though not all maxima and minima are feature points. In the preferred implementation the starting point and ending point of each contour are treated as feature points.

After feature points have been identified, the circled region is reconstructed using the feature points. This is illustrated at step 262. In essence, each contour generated at step 258 is broken into segments at the feature points. These segments are examined and reconnected such that segments belonging to different objects are separated and those belonging to the same object are connected.

The main criterion for reconnecting the contour segments is to check the smoothness when making the transition between neighboring segments. For each contour segment, a small area around its starting and ending points is examined. The points on the two ends are fitted into lines so that the slope (angles coming and going out of the segment) can be estimated. These estimated angles are used to assess whether two line segments are approaching one another such that they should be connected as belonging to the same contour or are crossing one another such that they belong to unrelated contours.

Using the circles reconstructed at step 262, the user-drawn circles are identified at step 264 through a series of tests. The first test is based on the size of the contour as well as the area the contour covers. If the length of the contour exceeds a predetermined threshold and the bounding box of the contour covers a predetermined area, the algorithm considers the contour to be a user-drawn circle.

However, in order to discriminate between user-drawn circles and machine-printed frames, such as rectangular frames, machine-printed circles or tables, the smoothness of the connected contour is examined. One way to measure smoothness is to calculate the average curvature along the connected contour. If smoothness exceeds a predetermined threshold, the contour is considered to be machine-printed.

Because the algorithm reconstructs circled regions from the calculated feature points, it is able to identify user-drawn circles even if they contain small gaps or breaks. If desired, the user-drawn circle candidates can be further evaluated to determine if any gaps are sufficiently large to warrant rejection as user-drawn circles. The analysis (depicted at step 266) involves assessing the distant between the starting point and ending point of a contour. Distance can be assessed in a variety of different ways.

One technique for assessing distance is to determine whether one end point is within a predetermined radial distance from the other end point. We refer to this as a circular distance function. Another technique is to define a square bounding box of predetermined size around one end point and to determine whether the other end point is within that bounding box. We refer to this as the square distance function. A third technique is to define a square bounding box of predetermined size around one end point and then to rotate the bounding box around that end point to determine if at any rotational orientation the second end point falls within the bounding box. This will occur, if at all, when one corner of the bounding box lies on a line between the two end points. We call this the Manhattan distance function.

If the contour fails to pass any of the above tests, then it is considered to be an open arc, as opposed to a user-drawn circle. Once the user-drawn circle is identified as described above, the bounding box around its contour is used to delimit the region that will be extracted for subsequent optical character recognition analysis. This is illustrated at step 268. The image inside the bounding box of the contour is extracted and optical character recognition is performed on the extracted image to ascertain the keyword or keywords for database lookup. If no good circle is identified, the system can be configured to attempt to extract a fax number from within a "circle" previously rejected as an open arc or poorly drawn circle. The extracted number is presented to the user to confirm or correct, as described above.

Operation

Keywords may be entered by the user under a variety of different circumstances. Keywords can be entered as part of a task specification, as when specifying the number of copies to be made by a copier prior to digitizing the scanned document. If the electronic imaging apparatus supports multi-tasking operations, the user can enter keywords while the apparatus is scanning the document. The scanning mechanism 100 may have an automated page feeding capability and the user may enter keywords while the feeding mechanism is in operation. Keywords may also be entered as part of a task specification such as identifying the image processing and/or image routing to be performed by the imaging device. In this regard, the imaging device may perform additional processes on the scanned image once it is loaded into memory 102. Additionally, the imaging device may have an associated telecommunications component (not shown) for faxing the image or sending it via a computer network to a remote location. Furthermore, the imaging device may have an associated printing mechanism to allow hard copies of the image in memory 102 to be printed.

As noted above, the system can be used without first providing the user identification. This is done by entry into a keyword mode, which can be selected by selecting a suitable touchpad "button" on the display screen. When the user selects the keyword mode, a predetermined set of keywords is displayed on the touch screen. The keywords can be hierarchically organized. The user simply selects appropriate keywords (one or more keywords may be selected). When a number has to be entered as part of the keyword, such as a purchase order number, the numerical keyboard 110 is used. All selected keywords are stored in memory 120 so that the same keywords can be reused for a series of similar documents. Stored keywords can be recalled and modified by the user. Thus a keyword containing an associated purchase order number may be modified by recalling a previously stored keyword with number and then editing the number using the numerical keyboard.

When keywords are not found in the keyword list, the user may add them. The presently preferred embodiment employs another operational mode, referred to herein as "Other Mode". When the user selects the Other Mode the numerical keyboard 110, character keyboard 112, handwriting recognition module 114, voice recognition module 116 and electronic ink module 118 may be used to input the keyword being added.

Note that when the electronic ink module 118 is used, the user-entered annotation may not necessarily represent a keyword in the conventional sense. Rather, the user-drawn annotation can be any combination of user-drawn strokes that the user wishes to serve as a keyword to be linked with the image data being scanned. For example, the user could draw a simple picture and that picture would then serve as a keyword for later document retrieval. The electronic ink matching would thus also be useful when entering characters in a language that is not supported by the native system. For example, the user could draw Kanji characters or Chinese characters to represent words in an Asian language such as Japanese or Chinese, without requiring the system to perform recognition of those characters.

As the user enters new keywords into the system, the user can also optionally store the logical meaning of those keywords. Thus the user could specify that a certain Vendor keyword is associated with the Purchase Order keyword. The keyword and its logical meaning could thus be stored using XML, for example.

From the foregoing it will be seen that the invention provides a system for conveniently assigning a keyword to a digitized image. The user simply enters the keyword information at the digitizing equipment. The system formats the keyword information and assigns the formatted information to the digitized image. Because users are allowed to assign appropriate keywords to documents when they digitize them, they do not need to bother with the additional steps required by conventional software or hardware document management systems.

While the invention has been described in its presently preferred embodiment in order to afford an enlightened understanding of the invention, and to describe its principles, it will be understood that the invention can be implemented in different ways without departing from the spirit of the invention as set forth in the appended claims.

What is claimed is:

1. An electronic imaging device for generating a digitized image of an input document having a plurality of physical pages, comprising:
    a digitizer to generate the digitized image from the input document;
    a keyword entry system for determining at least one keyword to be associated with the digitized image, said keyword entry system determining at least one said keyword from at least one handwritten keyword on said physical pages, said keyword entry system determining keywords from handwritten keywords on the initial page of said plurality of pages, said keywork entry system foregoing determination of keywords from handwritten words on all pages other than said initial page in said plurality of pages;
    a linker to generate linking information that associates the keyword with the digitized image; A keyword manager for storing the selected keyword in a keyword list being organized hierarchically and
    a database to store the digitized image and linking information, wherein the determined keyword is appended to the digitized image.

2. The imaging device of claim 1 wherein the keyword is stored with the digitized image in the database.

3. The imaging device of claim 2 wherein the keyword is included in a tag of a TIFF file that contains the digitized image.

4. The imaging device of claim 1 further including a keyword manager for storing the keyword.

5. The imaging device of claim 4 wherein the keyword manager stores the keyword in a keyword list.

6. The imaging device of claim 5 wherein the keyword list is organized hierarchically.

7. The imaging device of claim 5 wherein the keyword list is organized in an XML compatible format.

8. The imaging device of claim 2 wherein the keyword entry system includes a keyword entry device to input the keyword.

9. The imaging device of claim 8 wherein the keyword entry device is selected from the group of: a real keyboard and a virtual keyboard.

10. The imaging device of claim 8 wherein the keyword entry system includes a user identifier provided by a user, that is associated with a user keyword list.

11. The imaging device of claim 10 wherein the user identifier is selected from the group of: a user ID, a password, signature recognition, a magnetic card, a timestamp, and a machine ID.

12. The imaging device of claim 2 further including a circled region detector for detecting a circled word written on the document, such that the circled word is used as the keyword.

13. The imaging device of claim 2 further including a circled region detector for detecting a circled word written on the document, such that the circled word is recognized and used as the keyword.

14. The imaging device of claim 8 wherein the keyword is added to the keyword list.

15. A system for assigning a selected keyword to a digitized image, comprising:
    a digitizer to generate the digitized image from an input document having a plurality of physical pages;
    a keyword entry system for determining at least one selected keyword, the keyword entry system including a keyword entry device for entering user information, said keyword entry system determining at least one said keyword from at least one handwritten keyword on said physical pages, said keywork entry system determining keywords from handwritten keywords on the initial page of said plurality of pages, said keyword entry system foregoing determination of keywords from handwritten words on all pages other than said initial page in said plurality of pages;
    a keyword manager for storing the selected keyword in a keyword list being organized hierarchically;
    a linker to generate linking information that associates the selected keyword with the digitized image; and
    a database to store the digitized image and linking information, wherein the selected keyword is appended to the digitized image.

16. The system of claim 15 wherein the user information includes a user identifier and an input keyword.

17. The system of claim 15 wherein the keyword entry system is selected from the group of: a virtual keyboard and a real keyboard.

18. A method for assigning keywords to digitized images, comprising:
    providing an input document having a plurality of physical pages;
    generating a digitized image from the input document;
    determining at least one selected keyword to be associated with the digitized image, said determining selecting at least one said keyword from at least one handwritten keyword on said Physical pages, said determining selecting keywords from handwritten keywords on the initial page of said plurality of pages, said determining foregoing determination of keywords from handwritten words on all pages other than said initial page in said plurality of pages;
    generating linking information that associates the selected keyword with the digitized image, A keyword manager for storing the selected keyword in a keyword list being organized hierarchically wherein the determined keyword is appended to the digitized image; and
    storing the digitized image and linking information.

19. The method of claim 18 wherein the step of determining further includes inputting user information with a keyword entry device.

20. The method of claim 18 wherein the step of determining further includes detecting a circled region on the digitized image, such that the circled region includes a circled keyword.

21. The method of claim 18 wherein the step of determining further includes detecting a circled region on the digitized image and performing recognition on said circled region to select said keyword.

22. The method of claim 18 wherein the step of determining further includes on-line handwriting recognition of a user-supplied writing.

23. The method of claim 18 wherein the step of determining further includes performing voice recognition on a user-supplied utterance.

24. The method of claim 18 wherein the step of determining further includes performing electronic ink matching upon a user-supplied writing.

25. The method of claim 18 wherein the step of determining further includes receiving a user-supplied alphanumeric input.

26. The method of claim 18 further comprising storing said keyword as part of an image file containing said digitized image.

27. The method of claim 18 further comprising storing said keyword within a file name associated with an image file containing said digitized image.

28. The method of claim 18 further comprising storing said keyword within a directory name and storing an image file containing said digitized image under said directory name.

* * * * *

UNITED STATES PATENT AND TRADEMARK OFFICE
CERTIFICATE OF CORRECTION

PATENT NO. : 6,625,335 B1
DATED : December 1, 2003
INVENTOR(S) : Junichi Kanai

It is certified that error appears in the above-identified patent and that said Letters Patent is hereby corrected as shown below:

Column 9,
Line 28, "keywork" should be -- keyword --.
Line 33, "A" should be -- a --.

Column 10,
Line 17, "keywork" should be -- keyword --.
Line 45, "Physical" should be -- physical --.
Line 52, "A" should be -- a --.

Signed and Sealed this

Thirtieth Day of March, 2004

JON W. DUDAS
*Acting Director of the United States Patent and Trademark Office*